United States Patent [19]

Maloney

[11] 4,186,509
[45] Feb. 5, 1980

[54] EXPANDABLE FISH LURE

[76] Inventor: Willard S. Maloney, 4360 SW. 4th St., Miami, Fla. 33134

[21] Appl. No.: 896,715

[22] Filed: Apr. 17, 1978

[51] Int. Cl.² ............................................. A01K 83/02
[52] U.S. Cl. .......................................... 43/36; 43/37
[58] Field of Search ............ 43/34, 35, 36, 37, 42.04, 43/42.5, 42.52, 44.82

[56] References Cited

U.S. PATENT DOCUMENTS

| | | | |
|---|---|---|---|
| 2,619,758 | 12/1952 | Freire | 43/36 |
| 2,759,289 | 8/1956 | Haape | 43/37 |
| 3,163,956 | 1/1965 | Krutsch | 43/35 |
| 3,292,297 | 12/1966 | Dupont | 43/36 |
| 4,104,820 | 8/1978 | Bardebes | 43/36 |

FOREIGN PATENT DOCUMENTS 631130 11/1961 Canada ......................... 43/36

Primary Examiner—Nicholas P. Godici
Assistant Examiner—Robert P. Olszewski
Attorney, Agent, or Firm—Duckworth, Hobby & Allen

[57] ABSTRACT

An expandable fish lure adapted to be coupled to a fishing line includes a pair of substantially flat sides having a fish lure appearance in order to attract fish. The lure is formed of a unitary, U-shaped member for biasing said side members apart, each side carrying a fish hook at one extremity thereof. Locking means, in the form of an axial shaft extending between the two sides and a pair of locking plates at the extremities of the sides, cooperate together against the tension of the biasing means until such time as the axial shaft is pulled through the two locking plates to permit release of the sides thereby causing one of the fish hooks to expand away from the shaft.

9 Claims, 4 Drawing Figures

EXPANDABLE FISH LURE

BACKGROUND OF THE INVENTION

1. Field of the Invention

The present invention relates to fishing lures and hooking arrangements, and in particular relates to multiple hook arrangements which are designed to expand under tension.

2. Description of the Prior Art

A number of expandable fish hook assemblies for lures have been devised and disclosed in the prior art.

In U.S. Pat. No. 2,644,264, Heki discloses a double fish hook arrangement having a looped biasing spring between the sides and having a "mouse trap" type lock release to permit the sides to expand. The release includes a shaft which spreads between the two hooks when in the open position. In the closed position, the arrangement taught by Heki employs a ring which holds the shaft in place, the shaft having a hook on one end which engages one of the sides.

In U.S. Pat. No. 2,759,289, Haape discloses a combined fish-hook and trap arrangement employing an axial shaft which is spring-loaded, the shaft having a curved cam plate attached at the end of the shaft and between the two fish-hook sides, such that axial movement of the shaft causes the cam plate to force the two fish-hook sides in an expansion position.

In U.S. Pat. No. 3,410,019, Landi discloses another camming arrangement, in which the forward extremities of the fish hooks are pivoted, and the barbed ends of the fish hooks cross, with a camming ring attached between the fish hooks and coupled to the fishline, such that tension on the lure causes the cam ring to slide through the lure and force the two hooks outwardly with respect to the lure. A somewhat similar arrangement is taught by Wolf in U.S. Pat. No. 2,597,832.

Tomsello, in U.S. Pat. No. 3,081,572, discloses a weedless fish lure employing another form of the "mouse trap" type release.

In U.S. Pat. No. 1,812,906, Swearingen discloses an artificial lure having a pair of fish hooks joined together by a looped spring, and being held together by a catchpin. Movement of the looped spring toward the front of the lure responsive to tension of the lure on the line causes the fish hooks to disengage from the catchpin, and spring outward into an expansion position.

Burnett, in U.S. Pat. No. 3,026,645, discloses an expandable fish hook assembly, in which the fish hooks are beveled out of a cylindrical container responsive to axial drag on the fish hooks with respect to the cylindrical storage tube.

Arrangements like that described in the prior art patents referred to above tend to be unduly complex and expensive, and are difficult to reload; that is, are difficult to return to the nonexpanded condition. It is therefore desirable to employ a simple release mechanism for such fish lure assemblies, but which release permits the use of relatively flat and wide sides, such that a true artificial fish lure appearance can be obtained with the device. Typical with such prior art arrangements as those described above, those arrangements which have an artificial lure appearance are relatively complex and are difficult to load into the loaded position. However, the relatively simple arrangements, such as those disclosed in the Haape and Heki patents are not easily adapted to the artificial lure structures.

SUMMARY OF THE INVENTION

The present invention contemplates an expandable fish lure adaptable to be coupled to a fishing line, and comprises a pair of substantially flat sides having a fish lure appearance in order to attract fish. Means are coupled to both of the sides for biasing the side members apart. A pair of fish hooks are provided, each carried by one of the sides at one extremity thereof. Locking means with the assembly includes a rigid shaft coupled to the fishing line, the locking means providing means for locking the sides together against the tension of the biasing means, the locking means further including means for getting release of the sides responsive to movement of the shaft axially with respect to the fishing line.

In a preferred embodiment of the present invention, the two sides in the biasing means comprise a unitary, U-shaped member having substantially flat sides and a bridge therebetween having a hole therein, the member and the bridge formed of a springy material having an elastic memory. By way of example, the unitary, U-shaped member may comprise a stainless steel material, or alternatively a polyresinous material having an elastic memory, such as nylon.

In the preferred embodiment of the present invention, the locking means includes first and second locking plate coupled respectively to the first and second sides of the lures. Each locking plate includes a hole adapted to receive the shaft, the holes being aligned when the shaft is extending therethrough. Preferably, the shaft includes a beveled extremity, and a shoulder having a dimension substantially greater than the upper locking plate, in order that the movement of the shaft out of the two holes in the first and second locking plates is restricted.

Further in accordance with the preferred embodiment of the present invention, each locking plate is joined to the respective side of the lure with the corresponding fish hook by way of a common fastener.

THE DRAWING

DETAILED DESCRIPTION OF THE PREFERRED EMBODIMENT

The preferred embodiment will now be described in detail with reference to FIGS. 1-4.

Figure 1:
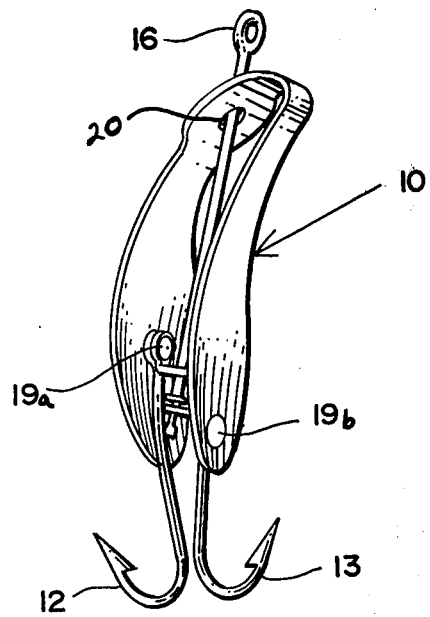
FIG. 1 is a perspective view illustrating the preferred embodiment of the present invention.
Figure 2:
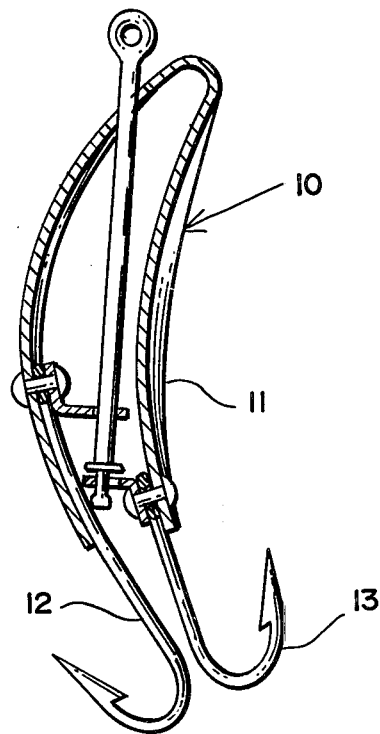
FIG. 2 is a side cross-sectional elevation of the preferred embodiment of the present invention, illustrating the expandable fishing lure in the nonexpanded, closed position.

With reference first to FIGS. 1 and 2, the expandable fishing lure of the present invention, which is referred to generally by the reference numeral 10, comprises a unitary, U-shaped fish lure member 11 defining two flat sides and a biasing bridge therebetween, with the bridge including a hole 20 therein. The unitary, U-shaped member 11 may be shaped like a bass lure, or similar lure. However, it will be understood by those skilled in the art that the term "flat side" as employed in the above description is intended to mean a relatively wide lure body, and is not intended to be limited to the specific thin-gauge metal structures shown in the drawings. The U-shaped fish lure member 11 is formed of a springy material having an elastic memory, such as spring steel or nylon. The bridge between the two extending sides of the fish lure member 11 is constructed such that they are biased apart by the tension of the bridge, when not being restrained in the manner described in greater detail below.

Figure 3:
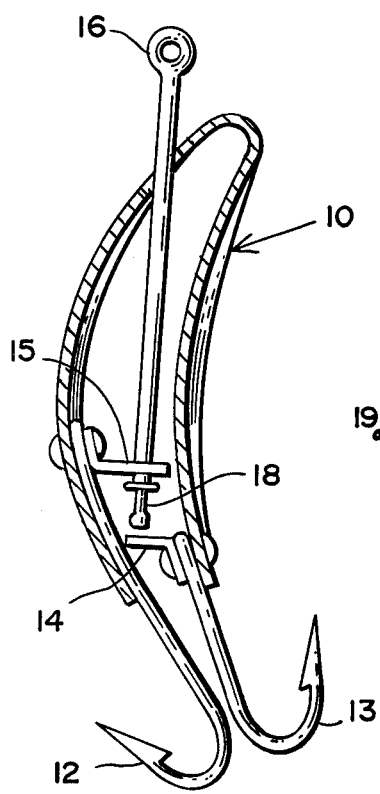
FIG. 3 is a cross-sectional, side elevation similar to that of FIG. 2, illustrating movement of the shaft associated with the preferred embodiment.
Figure 4:
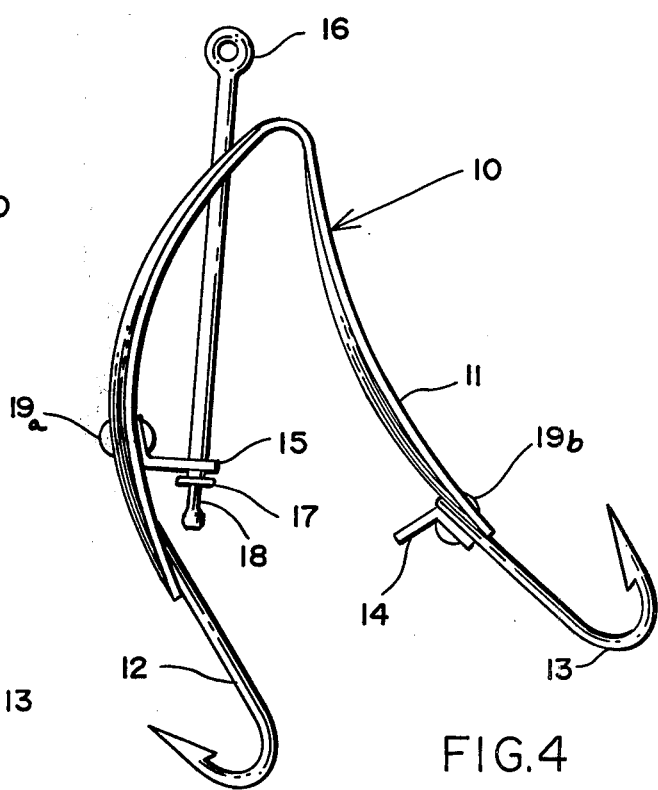
FIG. 4 is a side view illustrating the operation of the expandable fishing lure in accordance with the preferred embodiment of the present invention.

Reference is now made to FIGS. 2, 3, and 4. The lure 10 includes lower and upper locking plates 14, 15, each having a hole therein (note FIG. 2). Each locking plate 14, 15 comprises a flat-gauge metal or similar material which is joined to the inside of the respective one of the sides of the fish lure member 11, by respective fasteners 19a and 19b, as described in greater detail below.

The lure 10 is further provided with two fish hooks 12, 13, each fish hook being joined to a respective side of the fish lure member 11 by a corresponding fastener 19a, 19b and is commonly joined to the respective side with the associated locking plate 14, 15 as is shown in the drawing. Although the type of fastener used with this construction is not essential, a rivet or brad is preferable.

Reference to FIGS. 2, 3, and 4 is continued. The lure 10 further includes an axial shaft 16 extending through the hole 20 in the bridge of the fish lure member 11, and axially between the two sides of that member. The shaft 16 includes a shoulder 17 between the first and second locking plates 14, 15, the diameter of the shoulder 17 being sufficient to prevent the extremity of the shaft from moving through the hole in the second locking plate 15. The shaft 16 further includes a reduced thickness area adjacent the extremity thereof, forming a bevel 18 which permits the extremity of the shaft 16 to move easily into and out of the hole in the lower locking plate 14. Further, the shaft 16 includes an eyelet at the other extremity thereof, permitting the lure 10 to be joined to a conventional fishing line.

Operation of the lure 10 will now be described with reference to FIGS. 2, 3, and 4.

Initially the lure 10 is attached to a fishing line by threading the line through the eyelet in the shaft 16. The two sides of the U-shaped fish lure 11 are pushed together, such that the two holes in the locking plates 14, 15 are axially aligned. The shaft 16 is then pushed downward, so that the beveled extremity 18 thereof may be extended through the hole in the locking plate 14. This sets the lure 10 in the closed position. The fisherman can then pass the lure as desired during normal fishing activities.

When a sufficient tension is exerted between the shaft 16 and the fish lure member 11, as when a fish strikes the hooks 12, 13, the shaft 16 moves axially the hole 20 in the bridge portion of the fish lure member 11. At the same time, the beveled extremity 18 of the shaft 16 moves out of the hole in the first locking plate 14. This releases one side of the lure member 11, causing that side to spring away from the other side, by virtue of the biasing characteristics of the material from which the member 11 is formed and the shape of the bridge portion. The expansion of the lure 10 increases the likelihood that one of the hooks 12, 13 will be caught within the fish's mouth in the desired manner.

I claim:

1. An expandable fish lure adapted to be coupled to a fishing line comprising:

a pair of substantially flat sides having a fish lure appearance in order to attract fish;
means coupled to both of said sides for biasing said sides apart;
a pair of fish hooks, each carried by one of said sides at one extremity thereof;
locking means including a rigid shaft coupled to said fishing lure for locking said sides together against the tension of said biasing means, said locking means further including means permitting releasing of said sides responsive to movements of said shaft axially with respect to said fishing line, said locking means including two locking plates positioned between said sides, a first one of said locking plates coupled to a first one of said sides and having a hole therein for receiving said shaft, a second one of said locking plates coupled to the second side and having a hole therein for receiving said shaft, and wherein said holes in said first and second plates are aligned when said shaft is extending through both of said holes; and wherein said shaft includes a shoulder spaced from one extremity thereof, said shoulder having a dimension greater than said hole in said first plate to prevent said one extremity from moving through said hole in said first plate.

2. The apparatus recited in claim 1 wherein said side members and said biasing means comprises a unitary flat member of a material having an elastic memory.

3. The apparatus recited in claim 2 wherein said member is bent into a substantially U-shape, with said biasing means comprising a bridge between said two sides.

4. The apparatus recited in claim 1 further comprising said bridge having a hole therein in substantial alignment with said hole in said first plate when said shaft is extending through both of said holes in said first and second locking plates.

5. The apparatus recited in claim 4 wherein said shaft extends through said hole in said bridge.

6. The apparatus recited in claim 1 wherein said shaft includes a beveled on its extremity to permit said extremity to move easily out of said hole in said second plate.

7. The apparatus recited in claim 6 and further comprising an eyelet at the other extremity of said shaft.

8. The apparatus recited in claim 7 further comprising:

a first fastener holding said first plate and one of said fish hooks to a first one of said sides; and
a second fastener holding said second plate and one of said fish hooks to a second one of said sides.

9. An expandable fish lure adapted to be coupled to a fishing line, comprising:

a unitary, U-shaped member having substantially flat sides and a bridge therebetween having a hole therein, said member formed of a springy material having an elastic memory;
a pair of fish hooks, each carried by one arm of said U-shaped member at the extremity thereof;
a rigid shaft extending through said hole and between said sides, and coupled to said fishing line at one end thereof; and
locking means coupled to said sides and with said shaft for holding said sides together against the bias of said bridge, said locking means and said shaft cooperating to release said sides responsive to axial movement of said shaft between said sides, said locking means including a first locking plate coupled to a first one of said sides and having a hole therein for receiving said shaft and a second locking plate coupled to the second side and having a hole therein for receiving said shaft, said holes in said first and second plates being aligned when said shaft is extending through both of said holes; and wherein;

said shaft includes a shoulder spaced from one extremity thereof, said shoulder having a dimension greater than said hole in said first plate to prevent said one extremity from moving through said hole in said first plate.

* * * * *